(12) United States Patent
Currie et al.

(10) Patent No.: US 11,940,000 B2
(45) Date of Patent: Mar. 26, 2024

(54) PARTIALLY-THREADED PROJECTION WELD NUT

(71) Applicant: Volvo Car Corporation, Gothenburg (SE)

(72) Inventors: Martin Currie, Gothenburg (SE); Sten Johansson, Gothenburg (SE); Thomas Hermansson, Vastra Frölunda (SE); Leif Winberg, Gothenburg (SE); Hans Lundberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 667 days.

(21) Appl. No.: 16/442,630

(22) Filed: Jun. 17, 2019

(65) Prior Publication Data

US 2020/0392976 A1    Dec. 17, 2020

(51) Int. Cl.
  *F16B 37/06*    (2006.01)
  *B62D 27/06*    (2006.01)
  *F16B 39/30*    (2006.01)

(52) U.S. Cl.
  CPC .......... *F16B 37/061* (2013.01); *B62D 27/065* (2013.01); *F16B 39/30* (2013.01)

(58) Field of Classification Search
  CPC ............................... F16B 37/061; F16B 39/30
  USPC .......................................... 411/171, 277, 301
  See application file for complete search history.

(56) References Cited

U.S. PATENT DOCUMENTS

| | | | | |
|---|---|---|---|---|
| 497,702 A | * | 5/1893 | Brinkerhoff | F16B 39/30 411/938 |
| 976,847 A | * | 11/1910 | Chamberlin | F16B 39/30 411/938 |
| 2,255,384 A | * | 9/1941 | Hood | F16B 39/284 411/277 |
| 2,336,791 A | * | 12/1943 | La Barre | F16B 37/061 411/259 |
| 2,385,991 A | * | 10/1945 | Huntoon | F16B 37/061 411/171 |

(Continued)

FOREIGN PATENT DOCUMENTS

DE   102010024574 A1   12/2011
JP     2013137072 A    7/2013

*Primary Examiner* — Flemming Saether
(74) *Attorney, Agent, or Firm* — Clements Bernard Walker; Christopher L. Bernard

(57) ABSTRACT

A weld nut assembly, including: an annular flange structure; and an annular body structure coupled to the annular flange structure; wherein the annular flange structure and the annular body structure collectively define an inner bore, wherein at least a portion of the inner bore defined proximate the annular flange structure defines threads adapted to receive a screw disposed within the inner bore. The weld nut assembly further includes an annular washer or bottom structure coupled to the annular flange structure. Optionally, the weld nut assembly further includes an annular ring projection and a plurality of circumferential weld protrusions coupled to the annular flange structure. The annular flange structure is adapted to be welded to a surface of a body panel or other structure of a vehicle with the inner bore aligned with a hole formed through the body panel or other structure, the hole adapted to receive the screw therethrough.

13 Claims, 3 Drawing Sheets

(56) References Cited

U.S. PATENT DOCUMENTS

| | | | | |
|---|---|---|---|---|
| 2,426,653 A * | 9/1947 | Whelan | ................. | F16B 37/048 |
| | | | | 228/56.3 |
| 2,595,830 A * | 5/1952 | Demboske | ............ | F16B 37/061 |
| | | | | 411/171 |
| 2,784,758 A * | 3/1957 | Rohe | ......................... | F16B 5/01 |
| | | | | 411/171 |
| 3,003,533 A * | 10/1961 | Hubbard | ................. | F16B 39/28 |
| | | | | 411/277 |
| 3,435,871 A * | 4/1969 | Johnson | .................. | F16B 33/00 |
| | | | | 411/171 |
| 3,994,516 A * | 11/1976 | Fredd | ................. | E21B 17/0423 |
| | | | | 285/392 |
| 4,244,607 A * | 1/1981 | Blose | ................. | F16L 15/009 |
| | | | | 285/334 |
| 4,293,262 A * | 10/1981 | Holmes | .................. | F16B 39/38 |
| | | | | 411/311 |
| 5,143,499 A * | 9/1992 | Bobo | ..................... | F16B 39/01 |
| | | | | 411/902 |
| 5,533,850 A * | 7/1996 | Ishihara | ................ | F16B 37/061 |
| | | | | 411/171 |
| 6,702,536 B2 | 3/2004 | Nilsen | | |
| 6,755,601 B2 * | 6/2004 | Ohta | .................... | F16B 37/061 |
| | | | | 411/171 |
| 6,979,158 B2 | 12/2005 | Clinch et al. | | |
| 7,645,105 B2 * | 1/2010 | Hengel | ................. | B23K 11/14 |
| | | | | 411/171 |
| 7,654,782 B2 | 2/2010 | Nilsen et al. | | |
| 8,217,300 B2 * | 7/2012 | Hill | ...................... | B23K 33/008 |
| | | | | 219/121.64 |
| 2009/0169327 A1 * | 7/2009 | Wu | ....................... | F16B 37/065 |
| | | | | 411/106 |
| 2013/0236265 A1 * | 9/2013 | Diener | ................... | F16B 39/30 |
| | | | | 411/307 |

\* cited by examiner

PARTIALLY-THREADED PROJECTION WELD NUT

TECHNICAL FIELD

The present disclosure relates generally to the automotive manufacturing field. More particularly, the present disclosure relates to a partially-threaded projection weld nut that is affixed to a body panel or other structure of a vehicle to create an anchor point for a subsequent connection utilizing a screw.

BACKGROUND

In the automotive manufacturing field, weld nuts are affixed to a body panel or other structure of a vehicle to create anchor points for subsequent connections utilizing screws. Such a weld nut is typically welded to the "back" side of the body panel or other structure, coincident with a hole manufactured into the body panel or other structure. The weld nut then forms an anchor point by which something else (e.g., another body panel or other structure) can be connected to the body panel or other structure through the hole utilizing the screw. In this sense, the weld nut forms a nut that is integrated with the body panel or other structure for subsequent engagement by the screw, thereby joining the body panel or other structure with the other body panel or other structure. The weld nut is typically welded to the body panel or other structure via the application of a predetermined current to the weld nut for a predetermined period of time, such that the weld nut is heated and bonded to the body panel or other structure around the lower periphery of the weld nut, especially when all of the components involved are metallic.

FIG. 1 illustrates a conventional weld nut 10, which consists of an annular flange structure 12 and an annular body structure 14. The flange structure 12 and the body structure 14 collectively form an inner bore 16 that is adapted to receive the screw. Optionally, an entry end of the inner bore 16 includes a tapered portion (or guiding chamfer) 18 having a larger internal diameter than the rest of the inner bore 16, which facilitates the insertion of the screw into the inner bore 16. Generally, the inner bore 16 of the weld nut 10 is smooth and devoid of any threads when a watertight and grounded seal is desired, such that the screw taps its own hole, requiring a significant degree of insertion force. The flange structure 12 typically includes an annular washer or bottom structure 20 and an annular ring projection 22 protruding from the annular washer or bottom structure 20 that engage the surface of the body panel or other structure, with the ring projection 22 ultimately contributing to the weld and providing the watertight seal. Here, the flange structure 12, washer or bottom structure 20, and ring projection 22 are typically different portions of the same integral component.

It is desirable that the weld nut forms a solid seal with the body panel or other structure, such that the weld is both watertight and allows for electrical grounding. It is also desirable that ergonomic installation conditions are optimized. Conventional weld nuts often suffer from several important shortcomings in these respects, due to reliance on the washer or bottom structure and ring projection to form the weld, the smooth inner bore, and the degree of insertion force required to drive the screws into the weld nuts. Thus, an improved weld nut that addresses these shortcomings is still needed in the art, especially when a watertight and grounded seal is desired.

SUMMARY

In various exemplary embodiments, the present disclosure provides a partially-threaded projection weld nut that includes an annular flange structure and an annular body structure. The flange structure and the body structure collectively form an inner bore that is adapted to receive a screw through a hole formed in a vehicle body panel or other structure to which the flange structure of the weld nut is projection welded. Optionally, an entry end of the inner bore includes a tapered portion (or guiding chamfer) having a larger internal diameter than the rest of the inner bore, which facilitates the insertion of the screw into the inner bore. Importantly, the inner bore of the weld nut is at least partially threaded, such that the screw engages the threads and is subsequently pulled into and through the inner bore, requiring a reduced degree of insertion force. The threaded portion of the inner bore preferably is disposed proximate and includes the flange structure portion of the inner bore that is disposed adjacent to the body panel or other structure, and may also include the body structure portion of the inner bore as well, and thus the entire inner bore, although partial threading is desirable for providing a watertight and grounded seal while optimizing insertion ergonomics. Optionally, the internal diameter of the flange structure-proximate portion of the inner bore differs from the internal diameter of the body structure-proximate portion of the inner bore, with the internal diameter of the flange structure-proximate portion of the inner bore being smaller than the internal diameter of the body structure-proximate portion of the inner bore. The flange structure includes an annular washer or bottom structure and an annular ring projection protruding from the annular washer or bottom structure that engage the surface of the body panel or other structure, with the ring projection optionally partially forming the projection weld and providing a watertight seal with the body panel or other structure. A plurality of circumferential weld protrusions are also provided around the washer or bottom structure to ultimately form the projection weld. Typically, the body structure, flange structure, washer or bottom structure, ring projection, and weld protrusions are integrally formed from steel, brass, aluminum, or the like.

The flange structure is affixed to the surface of the body panel or other structure via the application of a predetermined current to the weld nut for a predetermined period of time, such that the weld nut is heated and bonded to the body panel or other structure around the lower periphery of the flange structure, especially when all of the components involved are metallic. The plurality of circumferential weld protrusions contribute to this projection weld. When affixed, the inner bore is aligned with the hole formed in the body panel or other structure. When another body panel or other structure is coupled to the body panel or other structure, the screw used catches the threads of the inner bore and is pulled into the inner bore with a reduced degree of insertion force. Thus, the screw is not required to tap the entire weld nut.

Thus, the weld nut of the present disclosure forms a solid seal with the body panel or other structure, such that the projection weld is watertight and allows for electrical grounding. Ergonomic installation conditions are optimized. The weld nuts of the present disclosure may be manufactured from a variety of metallic materials in a variety of sizes and may include a single unitary components or multiple adjoined components, as alluded to above.

In one exemplary embodiment, the present disclosure provides a weld nut assembly, including: an annular flange structure; and an annular body structure coupled to the annular flange structure; wherein the annular flange structure and the annular body structure collectively define an inner bore, wherein at least a portion of the inner bore proximate the annular flange structure defines threads adapted to receive a screw disposed within the inner bore. Optionally, at least a portion of the inner bore proximate the annular body structure defines additional threads adapted to receive the screw disposed within the inner bore. Optionally, at least a portion of the inner bore proximate the annular flange structure has a variable diameter. Optionally, the annular body structure is integrally formed with the annular flange structure. Optionally, at least a portion of the inner bore proximate the annular flange structure has a diameter that is different from a diameter of at least a portion of the inner bore proximate the annular body structure. The weld nut assembly further includes an annular washer or bottom structure coupled to or forming a portion of the annular flange structure opposite the annular body structure. Optionally, the weld nut assembly further includes an annular ring projection coupled to or forming a portion of the annular flange structure opposite the annular body structure. Preferably, the weld nut assembly further includes a plurality of circumferential weld protrusions coupled to or forming a portion of the annular flange structure opposite the annular body structure. The annular flange structure is adapted to be welded to a surface of a body panel or other structure of a vehicle with the inner bore aligned with a hole formed through the body panel or other structure, the hole adapted to receive the screw therethrough.

In another exemplary embodiment, the present disclosure provides a vehicle component, including: a planar structure having a first surface and a second surface disposed opposite the first surface; and a weld nut assembly coupled to the first surface of the planar structure, the weld nut assembly including: an annular flange structure; and an annular body structure coupled to the annular flange structure; wherein the annular flange structure and the annular body structure collectively define an inner bore, wherein at least a portion of the inner bore proximate the annular flange structure defines threads adapted to receive a screw disposed within the inner bore. Optionally, at least a portion of the inner bore proximate the annular body structure defines additional threads adapted to receive the screw disposed within the inner bore. Optionally, at least a portion of the inner bore proximate the annular flange structure has a variable diameter. Optionally, the annular body structure is integrally formed with the annular flange structure. Optionally, at least a portion of the inner bore proximate the annular flange structure has a diameter that is different from a diameter of at least a portion of the inner bore proximate the annular body structure. The weld nut assembly further includes an annular washer or bottom structure coupled to or forming a portion of the annular flange structure opposite the annular body structure. Optionally, the weld nut assembly further includes an annular ring projection coupled to or forming a portion of the annular flange structure opposite the annular body structure. Preferably, the weld nut assembly further includes a plurality of circumferential weld protrusions coupled to or forming a portion of the annular flange structure opposite the annular body structure. The annular flange structure is welded to the first surface of the planar structure with the inner bore aligned with a hole formed through the planar structure, the hole adapted to receive the screw therethrough, the screw adapted to couple another vehicle component to the second surface of the planar structure.

BRIEF DESCRIPTION OF THE DRAWINGS

The present disclosure is illustrated and described with reference to the various drawings, in which like reference numbers are used to denote like assembly components/method steps, as appropriate, and in which.

DESCRIPTION OF EMBODIMENTS

Figure 1:
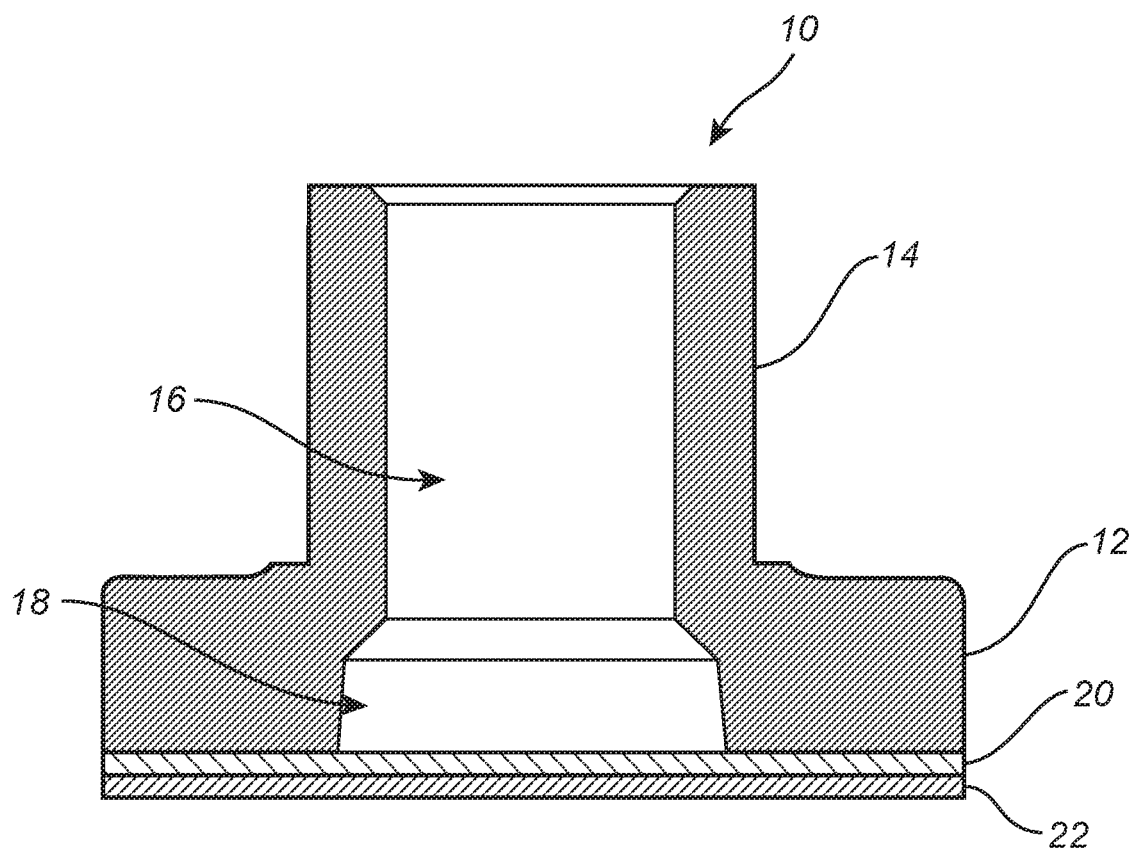
FIG. 1 is a side planar view of a conventional weld nut.
Figure 2:
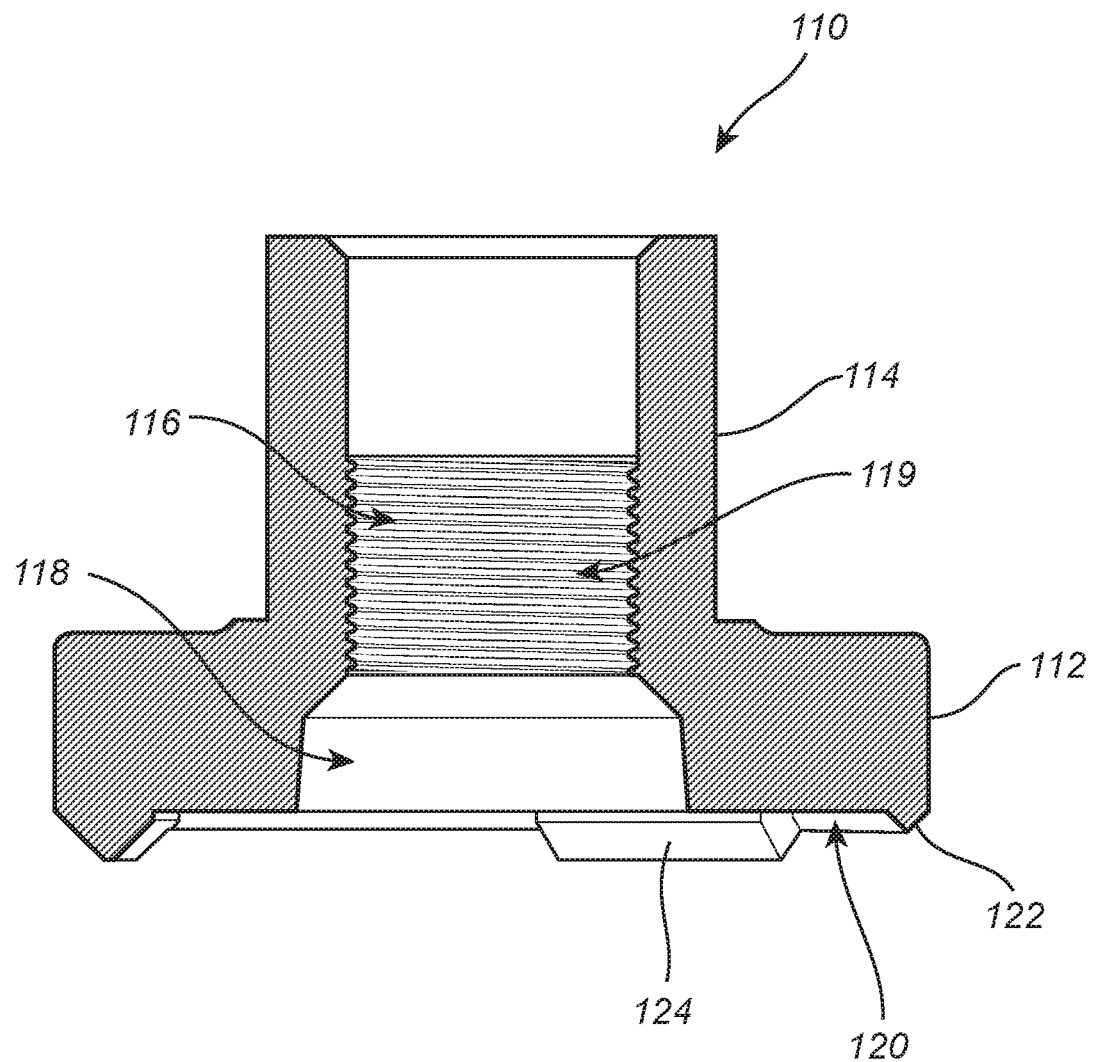
FIG. 2 is a side planar view of one exemplary embodiment of the partially-threaded projection weld nut of the present disclosure.

Referring now specifically to FIG. 2, in one exemplary embodiment, the partially-threaded projection weld nut 110 of the present disclosure includes an annular flange structure 112 and an annular body structure 114. The flange structure 112 preferably has a larger external diameter that helps to distribute loads to a vehicle body panel or other structure. The flange structure 112 and the body structure 114 collectively form an inner bore 116 that is adapted to receive a screw through a hole formed in the body panel or other structure to which the flange structure 112 of the weld nut 110 is projection welded. The inner bore 116 is thus preferably aligned with this hole and has a substantially circular cross-sectional shape. Optionally, an entry end of the inner bore 116 includes a tapered portion (or guiding chamfer) 118 having a larger internal diameter than the rest of the inner bore 116, which facilitates the insertion of the screw into the inner bore 116. In the embodiment illustrated, the tapered portion 118 of the inner bore is tapered from a larger internal diameter proximate to the body panel or other structure to a smaller internal diameter distal from the body panel or other structure. The flange structure 112 and the body structure 114 may be integrally formed from steel, brass, aluminum, or the like.

Importantly, the inner bore 116 of the weld nut 110 is at least partially threaded, such that the screw engages the threads 119 and is subsequently pulled into and through the inner bore 116, requiring a reduced degree of insertion force. The threaded portion 119 of the inner bore 116 preferably includes the flange structure-proximate portion 112 of the inner bore 116 that is disposed adjacent to the body panel or other structure, and may also include the body structure-proximate portion 114 of the inner bore 116 as well, and thus the entire inner bore 116. In the former case, the initially-engaged threads 119 pull the screw into the inner bore 116, while the subsequently-engaged smooth, self-tapped area provides the watertight seal and electrical grounding. In the latter case, the initially-engaged threads 119 pull the screw into the inner bore 116, while the subsequently-engaged threads 119 provide the watertight seal and electrical grounding, with the internal diameter of the initially-engaged threads 119 optionally differing from the internal diameter of the subsequently-engaged threads 119. In either case, the screw does not have to initially tap the internal bore 116, as is conventional, but engages the first threaded portion 119 and is pulled relatively easily into the internal bore 116 as it is rotated. Optionally, the internal diameter of the flange structure-proximate portion 112 of the inner bore 116 differs from the internal diameter of the body structure-proximate portion 114 of the inner bore 116, with the internal diameter of the flange structure-proximate portion 112 of the inner bore 116 being smaller (or larger) than the internal diameter of the body structure-proximate portion 114 of the inner bore 116. Of course, the inner bore 116 may also have a uniform internal diameter across all threaded and smooth portions, when both are utilized. In order to enhance the watertight and grounded seal, the threaded portion may be used to improve the ergonomics of screw engagement, while the smooth portion may require screw self-tapping and lock the screw in place.

Optionally, the flange structure 112 includes or forms an annular washer or bottom structure 120 or equivalent bottom surface and an annular ring projection 122 protruding from the annular washer or bottom structure 120 or equivalent bottom surface that engage the surface of the body panel or other structure, with the ring projection 122 optionally partially forming the projection weld and providing the watertight seal. Alternatively, the bottom portion of the flange structure 112 is open, with or without the presence of the annular ring projection 122. Thus, the flange structure 112 can be a hollow structure or a solid structure. When used, the ring projection 122 may form a wedge structure that sweeps a 90-degree angle, plus or minus 2 degrees, for example. This creates a discrete circumferential line of contact between the flange structure 112 and the surface of the body panel or other structure, enhancing the eventual projection weld joining the two components. Preferably, in this exemplary embodiment, a plurality of circumferential weld protrusions 124 are also provided around the washer or bottom structure 120 or equivalent bottom surface of the flange structure 112 to ultimately form the projection weld. As illustrated, these circumferential weld protrusions 124 may be discrete wedge structures that are evenly spaced about the outer circumference of the bottom of the flange structure 112, although other suitable shapes and configurations may of course be utilized. In effect, the circumferential weld protrusions 124 form a plurality of welding tabs. The flange structure 112, the washer or bottom structure 120, the ring projection 122, and the weld protrusions 124 may be integrally formed from steel, brass, aluminum, or the like.

The flange structure 112 is affixed to the surface of the body panel or other structure via the application of a predetermined current to the weld nut 110, including the flange structure 112, ring projection 122, and/or circumferential weld protrusions 124, for a predetermined period of time, such that the weld nut 110 is heated and bonded to the body panel or other structure around the lower periphery of the flange structure 112, especially when all of the components involved are metallic. Additional weld material may also be provided to enhance this component coupling. The plurality of circumferential weld protrusions 124 contribute significantly to this projection weld. When affixed, the inner bore 116 is aligned with the hole formed in the body panel or other structure. When another body panel or other structure is coupled to the body panel or other structure, the screw used catches the threads 119 of the inner bore 116 and is pulled into the inner bore with a reduced degree of insertion force. Thus, the screw is not required to tap the weld nut 110, at least not upon initial rotation.

Thus, the weld nut 110 of the present disclosure forms a solid seal with the body panel or other structure and secure engagement with the screw, such that the projection weld is watertight and allows for electrical grounding. Ergonomic installation conditions are optimized, as insertion forces are minimized, while purposeful smooth regions formed within the inner bore 116 can assist in preventing the screw from backing out of the inner bore 116 once installed therein. The weld nuts 110 of the present disclosure may be manufactured from a variety of metallic materials in a variety of sizes and thicknesses and may include a single unitary components or multiple adjoined components, as alluded to above.

Figure 3:
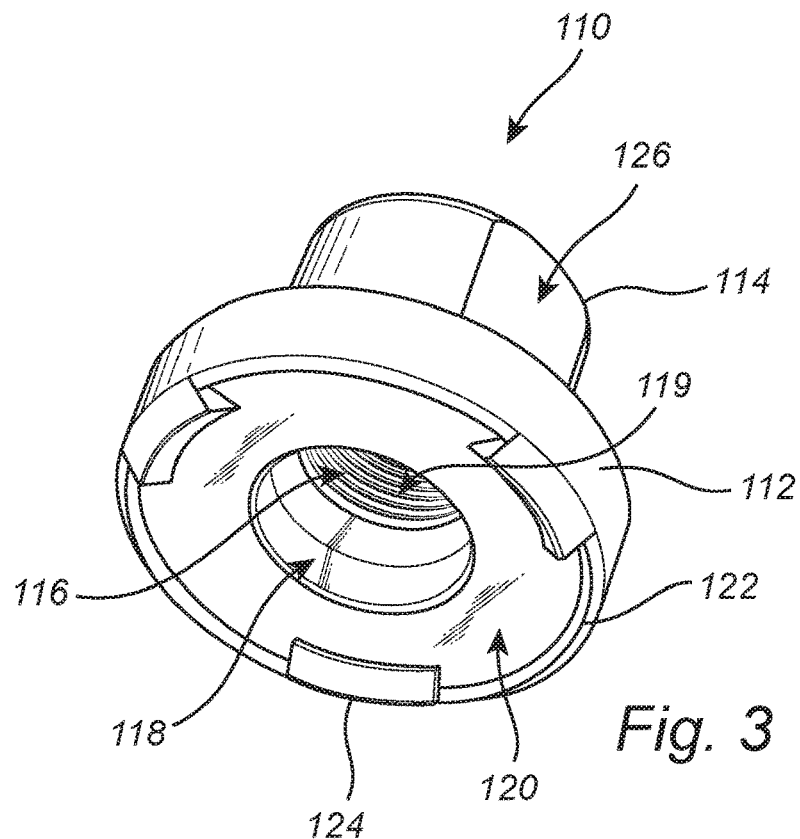
FIG. 3 is a perspective view of one exemplary embodiment of the partially-threaded projection weld nut of the present disclosure.

Referring now specifically to FIG. 3, in one exemplary embodiment, the partially-threaded projection weld nut 110 of the present disclosure again includes an annular flange structure 112 and an annular body structure 114. The flange structure 112 preferably has a larger external diameter that helps to distribute loads to a vehicle body panel or other structure. The flange structure 112 and the body structure 114 collectively form an inner bore 116 that is adapted to receive a screw through a hole formed in the body panel or other structure to which the flange structure 112 of the weld nut 110 is projection welded. The inner bore 116 is thus preferably aligned with this hole and has a substantially circular cross-sectional shape. Optionally, an entry end of the inner bore 116 includes a tapered portion (or guiding chamfer) 118 having a larger internal diameter than the rest of the inner bore 116, which facilitates the insertion of the screw into the inner bore 116. In the embodiment illustrated, the tapered portion 118 of the inner bore is tapered from a larger internal diameter proximate to the body panel or other structure to a smaller internal diameter distal from the body panel or other structure.

Importantly, the inner bore 116 of the weld nut 110 is at least partially threaded, such that the screw engages the threads 119 and is subsequently pulled into and through the inner bore 116, requiring a reduced degree of insertion force. The threaded portion 119 of the inner bore 116 preferably includes the flange structure-proximate portion 112 of the inner bore 116 that is disposed adjacent to the body panel or other structure, and may also include the body structure-proximate portion 114 of the inner bore 116 as well, and thus the entire inner bore 116. In the latter case, the initially-engaged threads 119 pull the screw into the inner bore 116, while the subsequently-engaged threads 119 provide the watertight seal and electrical grounding. Thus, the screw does not have to tap the internal bore 116, as is conventional, but engages the threaded portion 119 and is pulled relatively easily into the internal bore 116 as it is rotated. Optionally, the internal diameter of the flange structure-proximate portion 112 of the inner bore 116 differs from the internal diameter of the body structure-proximate portion 114 of the inner bore 116, with the internal diameter of the flange structure-proximate portion 112 of the inner bore 116 being smaller than the internal diameter of the body structure-proximate portion 114 of the inner bore 116. Of course, the inner bore 116 may also have a uniform internal diameter across all threaded and smooth portions, when both are utilized.

Optionally, the flange structure 112 includes an annular washer or bottom structure 120 or equivalent bottom surface and an annular ring projection 122 protruding from the annular washer or bottom structure 120 or equivalent bottom surface that engage the surface of the body panel or other structure, with the ring projection 122 optionally partially forming the projection weld and providing the watertight seal. Alternatively, the bottom portion of the flange structure 112 is open, with or without the presence of the annular ring projection 122. Thus, the flange structure 112 can be a hollow structure or a solid structure. When used, the ring projection 122 may form a wedge structure that sweeps a 90-degree angle, plus or minus 2 degrees, for example. This creates a discrete circumferential line of contact between the flange structure 112 and the surface of the body panel or other structure, enhancing the eventual projection weld joining the two components. Preferably, in this exemplary embodiment, a plurality of circumferential weld protrusions 124 are also provided around the washer or bottom structure 120 or equivalent bottom surface of the flange structure 112 to ultimately form the projection weld. As illustrated, these circumferential weld protrusions 124 may be discrete wedge structures that are evenly spaced about the outer circumference of the bottom of the flange structure 112, although other suitable shapes and configurations may of course be utilized. In effect, the circumferential weld protrusions 124 form a plurality of welding tabs.

The flange structure 112 is affixed to the surface of the body panel or other structure via the application of a predetermined current to the weld nut 110, including the flange structure 112, ring projection 122, and/or circumferential weld protrusions 124, for a predetermined period of time, such that the weld nut 110 is heated and bonded to the body panel or other structure around the lower periphery of the flange structure 112, especially when all of the components involved are metallic. Additional weld material may also be provided to enhance this component coupling. The plurality of circumferential weld protrusions 124 contribute significantly to this projection weld. When affixed, the inner bore 116 is aligned with the hole formed in the body panel or other structure. When another body panel or other structure is coupled to the body panel or other structure, the screw used catches the threads 119 of the inner bore 116 and is pulled into the inner bore with a reduced degree of insertion force. Thus, the screw is not required to tap the weld nut 110, at least not upon initial rotation. It should be noted that one or both of the flange structure 112 and the body structure 114 may be keyed or include tooling slots (or wrench grips) 126 such that the weld nut 110 can be easily held by an installer during the welding process.

Thus, the weld nut 110 of the present disclosure forms a solid seal with the body panel or other structure, such that the projection weld is watertight and allows for electrical grounding. Ergonomic installation conditions are optimized, as insertion forces are minimized, while purposeful smooth regions formed within the inner bore 116 can assist in preventing the screw from backing out of the inner bore 116 once installed therein. The weld nuts 110 of the present disclosure may be manufactured from a variety of metallic materials in a variety of sizes and thicknesses and may include a single unitary components or multiple adjoined components. It should be noted that the threaded portion 119 of the inner bore may be manufactured in a narrowed region of the inner bore 116, with the threads 119 being machined or cut, for example. Alternatively, the threaded portion 119 of the inner bore may be manufactured in a uniform region of the inner bore 116, with the threads 119 being die formed, for example.

Figure 4:
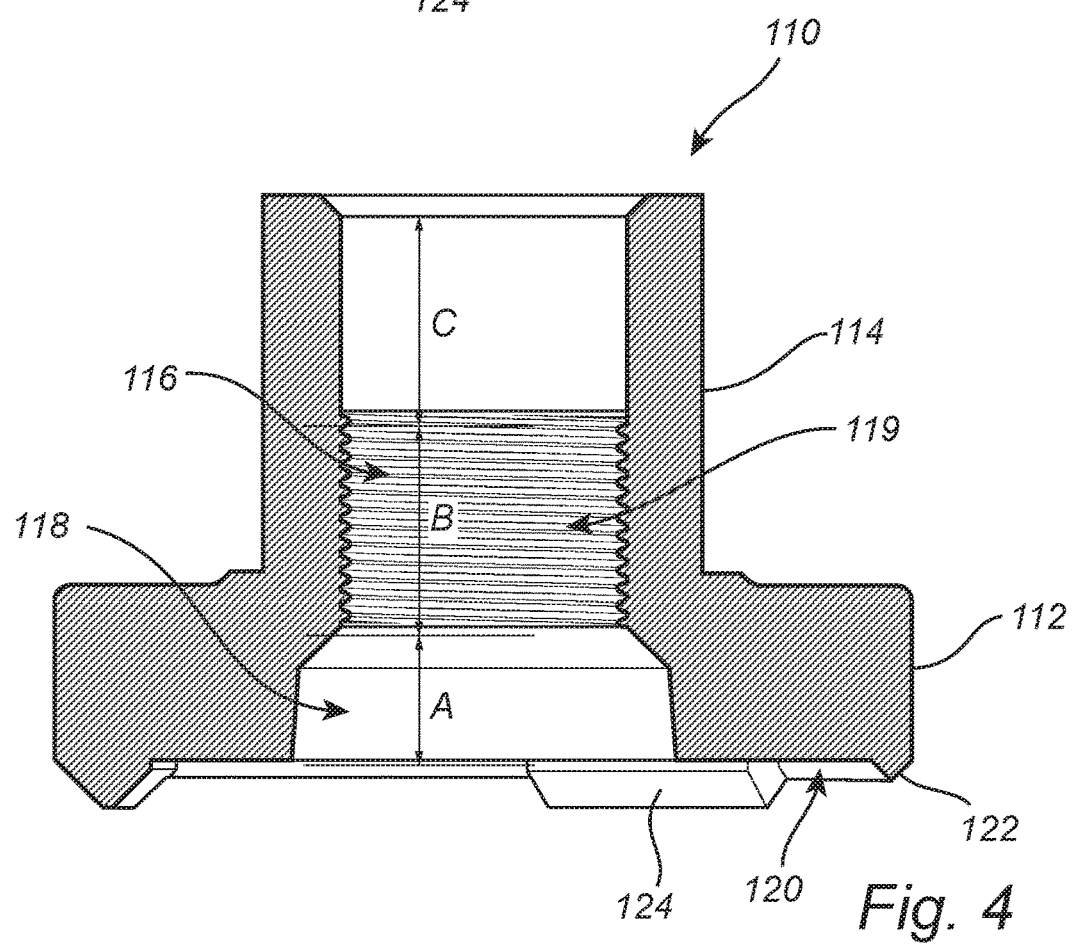
FIG. 4 is another side planar view of one exemplary embodiment of the partially-threaded projection weld nut of the present disclosure.

Referring now specifically to FIG. 4, in one exemplary embodiment, the partially-threaded projection weld nut 110 of the present disclosure includes an annular flange structure 112 and an annular body structure 114. The flange structure 112 preferably has a larger external diameter that helps to distribute loads to a vehicle body panel or other structure. The flange structure 112 and the body structure 114 collectively form an inner bore 116 that is adapted to receive a screw through a hole formed in the body panel or other structure to which the flange structure 112 of the weld nut 110 is projection welded. The inner bore 116 is thus preferably aligned with this hole and has a substantially circular cross-sectional shape. Optionally, an entry end of the inner bore 116 includes a tapered portion (or guiding chamfer) 118 having a larger internal diameter than the rest of the inner bore 116, which facilitates the insertion of the screw into the inner bore 116. In the embodiment illustrated, the tapered portion 118 of the inner bore is tapered from a larger internal diameter proximate to the body panel or other structure to a smaller internal diameter distal from the body panel or other structure.

Importantly, the inner bore 116 of the weld nut 110 is at least partially threaded, such that the screw engages the threads 119 and is subsequently pulled into and through the inner bore 116, requiring a reduced degree of insertion force. The threaded portion 119 of the inner bore 116 preferably includes the flange structure-proximate portion 112 of the inner bore 116 that is disposed adjacent to the body panel or other structure, and may also include the body structure-proximate portion 114 of the inner bore 116 as well, and thus the entire inner bore 116. In the latter case, the initially-engaged threads 119 pull the screw into the inner bore 116, while the subsequently-engaged threads 119 provide the watertight seal and electrical grounding. Thus, the screw does not have to tap the internal bore 116, as is conventional, but engages the threaded portion 119 and is pulled relatively easily into the internal bore 116 as it is rotated. Optionally, the internal diameter of the flange structure-proximate portion 112 of the inner bore 116 differs from the internal diameter of the body structure-proximate portion 114 of the inner bore 116, with the internal diameter of the flange structure-proximate portion 112 of the inner bore 116 being smaller than the internal diameter of the body structure-proximate portion 114 of the inner bore 116. Of course, the inner bore 116 may also have a uniform internal diameter across all threaded and smooth portions, when both are utilized.

Optionally, the flange structure 112 includes an annular washer or bottom structure 120 or equivalent bottom surface and an annular ring projection 122 protruding from the annular washer or bottom structure 120 or equivalent bottom surface that engage the surface of the body panel or other structure, with the ring projection 122 optionally partially forming the projection weld and providing the watertight seal. Alternatively, the bottom portion of the flange structure 112 is open, with or without the presence of the annular ring projection 122. Thus, the flange structure 112 can be a hollow structure or a solid structure. When used, the ring projection 122 may form a wedge structure that sweeps a 90-degree angle, plus or minus 2 degrees, for example. This creates a discrete circumferential line of contact between the flange structure 112 and the surface of the body panel or other structure, enhancing the eventual projection weld joining the two components. Preferably, in this exemplary embodiment, a plurality of circumferential weld protrusions 124 are also provided around the washer or bottom structure 120 or equivalent bottom surface of the flange structure 112 to ultimately form the projection weld. As illustrated, these circumferential weld protrusions 124 may be discrete wedge structures that are evenly spaced about the outer circumference of the bottom of the flange structure 112, although other suitable shapes and configurations may of course be utilized. In effect, the circumferential weld protrusions 124 form a plurality of welding tabs.

The flange structure 112 is affixed to the surface of the body panel or other structure via the application of a predetermined current to the weld nut 110, including the flange structure 112, ring projection 122, and/or circumferential weld protrusions 124, for a predetermined period of time, such that the weld nut 110 is heated and bonded to the body panel or other structure around the lower periphery of the flange structure 112, especially when all of the components involved are metallic. Additional weld material may also be provided to enhance this component coupling. The plurality of circumferential weld protrusions 124 contribute significantly to this projection weld. When affixed, the inner bore 116 is aligned with the hole formed in the body panel or other structure. When another body panel or other structure is coupled to the body panel or other structure, the screw used catches the threads 119 of the inner bore 116 and is pulled into the inner bore with a reduced degree of insertion force. Thus, the screw is not required to tap the weld nut 110, at least not upon initial rotation.

Thus, the weld nut 110 of the present disclosure forms a solid seal with the body panel or other structure, such that the projection weld is watertight and allows for electrical grounding. Ergonomic installation conditions are optimized, as insertion forces are minimized, while purposeful smooth regions formed within the inner bore 116 can assist in preventing the screw from backing out of the inner bore 116 once installed therein. The weld nuts 110 of the present disclosure may be manufactured from a variety of metallic materials in a variety of sizes and thicknesses and may include a single unitary components or multiple adjoined components.

Here, it is shown that region A of the inner bore 116, including the guiding chamfer 118, is configured to receive the screw and guide the screw into the inner bore 116 through the adjacent body panel or other structure. Region B of the inner bore 116, proximate the flange 112, is preferably threaded and serves to pull the screw into the inner bore 116 as the screw is rotated. Region C of the inner bore 116, proximate the body 114, may be threaded or unthreaded and serves to lock the screw in the inner bore 116 as the screw is rotated, thereby providing a watertight seal/grounded connection and preventing the screw from backing out. The threads 119 or region B may thus be different from the threads 119 of region C, if both are threaded, or the internal diameter of region C may be slightly larger than the internal diameter of region B, if region C is unthreaded, for example. Here, the flange 112, having a larger external diameter than the body 114, serves to distribute loads to the body panel or other structure, while the welding tabs 124 form the projection weld and the annular ring 122 also provides the watertight seal.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A weld nut assembly, comprising:
   an annular flange structure;
   an annular body structure coupled to the annular flange structure;
   an annular washer coupled to a bottom portion of the annular flange structure opposite the annular body structure;
   an annular ring projection comprising a triangle structure protruding from the annular washer opposite the annular body structure, wherein the annular ring projection protruding from the annular washer opposite the annular body structure is disposed around an outer periphery of the annular washer opposite the annular body structure; and
   a plurality of circumferential weld protrusions each comprising a triangle structure protruding from the annular washer and the annular ring projection opposite the annular body structure, wherein the plurality of circumferential weld protrusions protruding from the annular washer and the annular ring projection opposite the annular body structure are evenly spaced about the annular ring projection,
   wherein the annular flange structure and the annular body structure collectively define an inner bore, wherein a portion of the inner bore defined proximate the annular flange structure has a variable diameter, a portion of the inner bore defined proximate the annular flange structure defines threads adapted to pull a screw into the inner bore, and a portion of the inner bore defined proximate the annular body structure defines different threads adapted to lock the screw in the inner bore.

2. The weld nut assembly of claim 1, wherein the annular body structure is integrally formed with the annular flange structure.

3. The weld nut assembly of claim 1, wherein the annular washer is disposed within a periphery of the bottom portion of the annular flange structure.

4. The weld nut assembly of claim 1, wherein the annular flange structure is adapted to be welded to a surface of a body panel or other structure of a vehicle with the inner bore aligned with a hole formed through the body panel or other structure, the hole adapted to receive the screw therethrough.

5. The weld nut assembly of claim 1, wherein the threads defined by the inner bore proximate the annular flange structure are configured to engage threads of the screw when pulling the screw into the inner bore, and the threads defined by the portion of the inner bore proximate the annular body structure are configured to engage the threads of the screw to provide a watertight seal.

6. A vehicle component, comprising:
   a planar structure having a first surface and a second surface disposed opposite the first surface; and
   a weld nut assembly coupled to the first surface of the planar structure, the weld nut assembly comprising:
   an annular flange structure;
   an annular body structure coupled to the annular flange structure;
   an annular washer coupled to a bottom portion of the annular flange structure opposite the annular body structure;
   an annular ring projection comprising a triangle structure protruding from the annular washer opposite the annular body structure, wherein the annular ring projection protruding from the annular washer opposite the annular body structure is disposed around an outer periphery of the annular washer opposite the annular body structure; and
   a plurality of circumferential weld protrusions each comprising a triangle structure protruding from the annular washer and the annular ring projection opposite the annular body structure, wherein the plurality of circumferential weld protrusions protruding from the annular washer and the annular ring projection opposite the annular body structure are evenly spaced about the annular ring projection, wherein the annular flange structure and the annular body structure collectively define an inner bore, wherein a portion of the inner bore defined proximate the annular flange structure has a variable diameter, a portion of the inner bore defined proximate the annular flange structure defines threads adapted to pull a screw into the inner bore, and a portion of the inner bore defined proximate the annular body structure defines different threads adapted to lock the screw in the inner bore.

7. The vehicle component of claim 6, wherein the annular body structure is integrally formed with the annular flange structure.

8. The vehicle component of claim 6, wherein the annular washer is disposed within a periphery of the bottom portion of the annular flange structure.

9. The vehicle component of claim 6, wherein the annular flange structure is welded to the first surface of the planar structure with the inner bore aligned with a hole formed through the planar structure, the hole adapted to receive the screw therethrough, the screw adapted to couple another vehicle component to the second surface of the planar structure.

10. The vehicle component of claim 6, wherein the threads defined by the inner bore proximate the annular flange structure are configured to engage threads of the screw when pulling the screw into the inner bore, and the threads defined by the portion of the inner bore proximate the annular body structure are configured to engage the threads of the screw to provide a watertight seal.

11. A weld nut assembly, comprising:
an annular flange structure;
an annular body structure coupled to the annular flange structure;
an annular washer coupled to a bottom portion of the annular flange structure opposite the annular body structure;
an annular ring projection comprising a triangle structure protruding from the annular washer opposite the annular body structure, wherein the annular ring projection protruding from the annular washer opposite the annular body structure is disposed around an outer periphery of the annular washer opposite the annular body structure; and
a plurality of circumferential weld protrusions each comprising a triangle structure protruding from the annular washer and the annular ring projection opposite the annular body structure, wherein the plurality of circumferential weld protrusions protruding from the annular washer and the annular ring projection opposite the annular body structure are evenly spaced about the annular ring projection, wherein the annular flange structure and the annular body structure collectively define an inner bore, wherein a portion of the inner bore defined proximate the annular flange structure has a variable diameter, a portion of the inner bore defined proximate the annular flange structure defines threads adapted to pull a screw into the inner bore, and a portion of the inner bore defined proximate the annular body structure defines a smooth internal surface adapted to lock the screw in the inner bore.

12. The weld nut assembly of claim 11, wherein the annular washer is disposed within a periphery of the bottom portion of the annular flange structure.

13. The weld nut assembly of claim 11, wherein the portion of the inner bore defined proximate the annular flange structure that defines the threads also defines an internal diameter that is smaller than an internal diameter defined by the portion of the inner bore defined proximate the annular body structure that defines the smooth internal surface.

* * * * *